(12) United States Patent
Kim

(10) Patent No.: US 6,246,444 B1
(45) Date of Patent: Jun. 12, 2001

(54) DIGITAL AND ANALOG TV COMMON-USE RECEIVER HAVING SINGLE GHOST CANCELER AND GHOST CANCELLATION METHOD

(75) Inventor: Ki-bum Kim, Seoul (KR)

(73) Assignee: Samsung Electronics Co., Ltd., Kyungki-Do (KR)

(*) Notice: Subject to any disclaimer, the term of this patent is extended or adjusted under 35 U.S.C. 154(b) by 0 days.

(21) Appl. No.: 09/179,842

(22) Filed: Oct. 28, 1998

(30) Foreign Application Priority Data

Nov. 21, 1997 (KR) ................................. 97-62049

(51) Int. Cl.$^7$ .............................. H04N 5/21; H03H 7/30; H04B 3/20; H03C 7/00
(52) U.S. Cl. ...................... 348/614; 358/905; 375/231; 375/232; 375/229; 375/315; 370/290; 370/291
(58) Field of Search ...................... 348/614; 358/905; 375/231, 232, 229, 315; 370/290, 291

(56) References Cited

U.S. PATENT DOCUMENTS

| | | | |
|---|---|---|---|
| 4,864,403 | * 9/1989 | Chao et al. | 358/167 |
| 5,119,196 | * 6/1992 | Ayanoglu et al. | 358/167 |
| 5,267,041 | * 11/1993 | Matsunaga | 358/167 |
| 5,276,516 | * 1/1994 | Bramley | 358/167 |
| 5,311,312 | * 5/1994 | Oh | 348/614 |
| 5,341,177 | * 8/1994 | Roy et al. | 348/614 |
| 5,361,099 | * 11/1994 | Kim | 348/555 |
| 5,532,748 | * 7/1996 | Naimpally | 348/432 |
| 5,623,318 | * 4/1997 | Lee | 348/614 |
| 5,648,987 | * 7/1997 | Yang et al. | 375/232 |
| 5,654,765 | * 8/1997 | Kim | 348/614 |
| 5,886,748 | * 3/1999 | Lee | 348/614 |
| 5,907,371 | * 5/1999 | McNay et al. | 348/706 |

FOREIGN PATENT DOCUMENTS

| | | | |
|---|---|---|---|
| 8-98059 | 4/1996 | (JP) | H04N/5/21 |
| 8-98105 | 4/1996 | (JP) | H04N/5/46 |
| 9-130697 | 5/1997 | (JP) | H04N/5/46 |
| 9-149290 | 6/1997 | (JP) | H04N/5/14 |

* cited by examiner

*Primary Examiner*—Reinhard J. Eisenzopf
*Assistant Examiner*—Paulos Natnael
(74) *Attorney, Agent, or Firm*—Sughrue, Mion, Zinn, Macpeak & Seas, PLLC

(57) ABSTRACT

A digital/analog TV common-use receiver having a single ghost canceler, and a ghost cancellation method are provided. The single ghost canceler includes a first filter coefficient generator for generating first filter coefficients using a first reference signal included in the analog TV signal, a second filter coefficient generator for generating second filter coefficients using a second reference signal included in the digital TV signal, and a digital filter for filtering the analog TV signal using the first filter coefficients if the analog TV signal is received, and the digital TV signal using the second filter coefficients if the digital TV signal is received. Since an equalizer used when receiving a terrestrial digital TV broadcast is also used upon receiving a terrestrial analog TV broadcast, the single equalizer can correspond to both digital and analog TV signals.

16 Claims, 3 Drawing Sheets

DIGITAL AND ANALOG TV COMMON-USE RECEIVER HAVING SINGLE GHOST CANCELER AND GHOST CANCELLATION METHOD

BACKGROUND OF THE INVENTION

1. Field of the Invention

The present invention relates to a digital and analog TV common-use receiver which can receive both terrestrial digital and analog TV signals, and more particularly, to a digital and analog TV common-use receiver having a single ghost canceler which can correspond to both digital and analog broadcasts, and a ghost cancellation method.

2. Description of the Related Art

Recently, a terrestrial digital TV signal receiver (hereinafter, called "digital TV receiver") has been developed and will be put into use in the near future. Even when the digital TV receiver is put into use, both terrestrial digital and analog broadcasts will coexist until a predetermined time to protect the existing terrestrial analog TV signal receiver (hereinafter, called "analog TV receiver"). Accordingly, the digital TV receiver must be capable of receiving not only the digital TV signal but also the existing analog TV signal.

Meanwhile, a high-tech waveform equalizer (also called "a ghost canceler") having a hardware of large capacity is used to compensate for a ghost (also called "multipath distortion") generated by a reflected wave of a multipath, which is the most serious cause of image quality degradation, upon receiving a terrestrial signal. Thus, at present, utilization of the waveform equalizer in the terrestrial analog TV receiver is incomplete, but the digital TV receiver necessarily requires the waveform equalizer.

SUMMARY OF THE INVENTION

To solve the above problem, it is an objective of the present invention to provide a digital and analog TV common-use receiver having a single ghost canceler since an equalizer used when receiving a terrestrial digital TV signal is commonly used upon receiving a terrestrial analog TV signal.

It is another objective of the present invention to provide a ghost cancellation method for a digital and analog TV common-use receiver, which cancels a ghost corresponding to both terrestrial digital and analog TV signals.

Accordingly, to achieve the first objective, there is provided a digital/analog TV common-use receiver having a single ghost canceler, which can receive both analog and digital TV signals, the single ghost canceler comprising: a first filter coefficient generator for generating first filter coefficients using a first reference signal included in the analog TV signal; a second filter coefficient generator for generating second filter coefficients using a second reference signal included in the digital TV signal; and a digital filter for filtering the analog TV signal using the first filter coefficients if the analog TV signal is received, and the digital TV signal using the second filter coefficients if the digital TV signal is received, according to an analog/digital TV selection signal.

To achieve the second objective, there is provided a ghost cancellation method for a digital/analog TV common-use receiver for receiving both analog and digital TV signals, comprising the steps of: (a) generating first filter coefficients using a first reference signal included in the analog TV signal and a predetermined first reference signal; (b) generating second filter coefficients using a second reference signal included in the digital TV signal and a predetermined second reference signal; and (c) filtering the analog TV signal using the first filter coefficients if the analog TV signal is received, and the digital TV signal using the second filter coefficients if the digital TV signal is received, according to an analog/digital TV selection signal.

BRIEF DESCRIPTION OF THE DRAWINGS

The above objectives and advantages of the present invention will become more apparent by describing in detail a preferred embodiment thereof with reference to the attached drawings in which.

DESCRIPTION OF THE PREFERRED EMBODIMENT

Figure 1A:
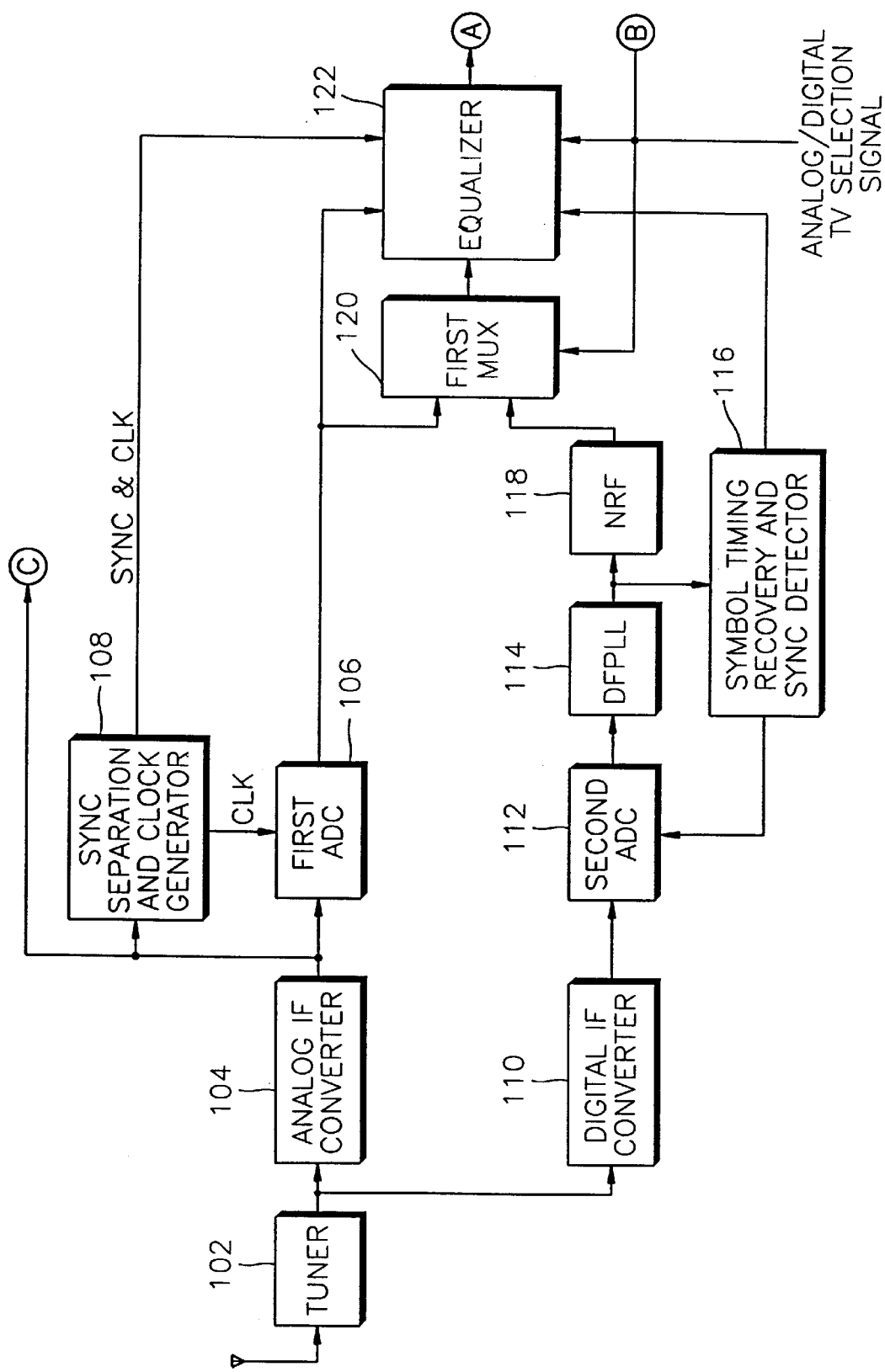
FIGS. 1A and 1B are a block diagram illustrating a digital and analog TV common-use receiver according to the present invention.
Figure 1B:
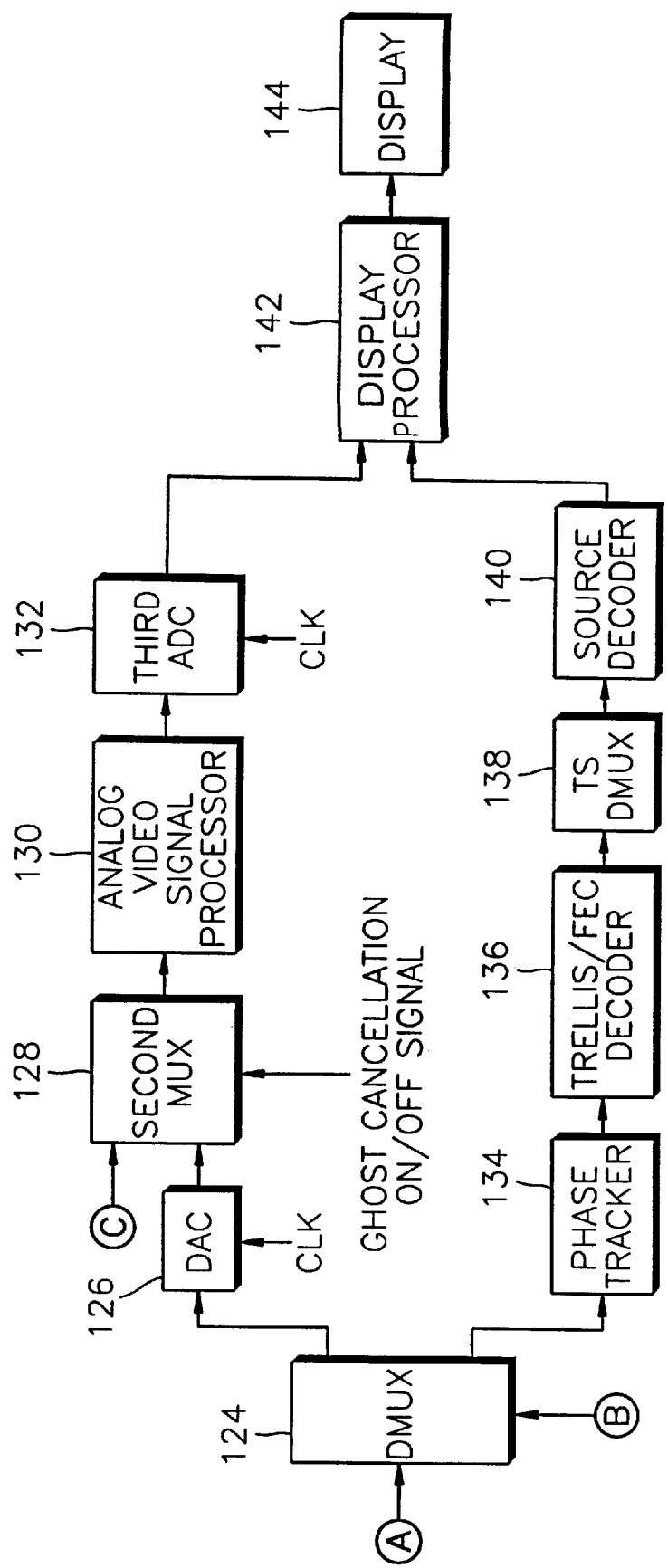

Referring to FIG. 1, a tuner 102 is a single tuner which can receive both terrestrial digital and analog TV signals and convert a channel-tuned radio frequency (RF) signal into an intermediate frequency (IF) signal. The IF signal is converted into analog and digital TV baseband signals respectively by analog and digital IF converters 104 and 110.

A first analog-to-digital converter (ADC) 106 converts an analog TV baseband signal supplied from the analog IF converter 104 into a digitized analog TV baseband signal, and applies the result to an input port of a first multiplexer (MUX) 120. A sync separation and clock generator 108 separates a synchronous signal from the analog TV baseband signal supplied from the digitized analog IF converter 104, generates a sampling clock signal CLK synchronized with the separated synchronous signal and applies the generated sampling clock signal CLK to the first ADC 106, a digital-to-analog converter (DAC) 126, and a third ADC 132, and applies the separated synchronous signal and the sampling clock signal CLK to an equalizer 122.

A second ADC 112 converts a digital TV baseband signal supplied from the digital IF converter 110 into digital data. A digital frequency phase locked loop (DFPLL) 114 recovers a carrier wave using a pilot signal included in the data supplied from the second ADC 112 and applies the result to a symbol timing recovery and sync detector 116. Here, the DFPLL 114 can be called a digital carrier wave recoverer.

The symbol timing recovery and sync detector 116 recovers a symbol timing from a signal having a recovered carrier wave, detects synchronous signals (segment and field synchronous signals) from the signal having a recovered carrier wave, generates a clock signal using the recovered symbol timing and the synchronous signal (here, only the segment synchronous signal), applies a necessary sampling clock signal to the second ADC 112, applies a driving clock signal to several digital TV signal processing blocks (not shown), and applies the detected field synchronous signal to an equalizer 122. An NTSC rejection filter (NRF) 118 removes NTSC interference components from the carrier wave signal supplied from the DFPLL 114 and applies the result to the other input port of the first MUX 120.

The first MUX 120 selects the digitized analog TV signal input via its one input port, when an analog TV signal is received, and selects the digital TV signal which is processed by the NRF 118 and applied via its the other input port, when a digital TV signal is received, according to an analog/digital TV selection signal. Here, the analog/digital TV selection signal is generated by a received signal determiner, which is not shown in the drawing. For example, the received signal determiner determines whether a received signal is an analog or digital TV signal, using a field synchronous sequence as a reference signal, and generates the analog/digital TV selection signal.

The equalizer 122 cancels a ghost carried in a signal selected by the first MUX 120 and applies the result to a demultiplexer (DMUX) 124. The output of the DMUX 124 is controlled by an analog/digital TV selection signal. That is, the DMUX 124 applies an analog TV signal whose ghost is canceled by the equalizer 122, to the DAC 126, when an analog TV signal is received, and applies a digital TV signal whose ghost is canceled by the equalizer 122, to a phase tracker 134, when a digital TV signal is received.

The DAC 126 converts the digitized analog TV signal supplied from the DMUX 124 into an analog signal, and applies the result to an input port of a second MUX 128. The second MUX 128 directly receives the analog TV baseband signal supplied from the analog IF converter 104 via its other input port. The second MUX 128 selects only one input signal according to a ghost cancellation on/off signal. That is, the second MUX 128 selects a ghost-canceled analog TV signal supplied from the DAC 126, if a ghost cancellation "on" signal is applied, and selects the analog TV baseband signal supplied from the analog IF converter 104 if a ghost cancellation "off" signal is applied.

Here, the ghost cancellation on/off signal can be generated from a TV microcomputer (not shown) by a user selection.

An analog video signal processor 130 processes a signal selected by the second MUX 128 into a typical analog video signal and applies the processed analog video signal to a third ADC 132. The third ADC 132 converts the analog video signal into a digitized analog video signal and applies the result to an input port of a display processor 142.

Meanwhile, the phase tracker 134 corrects a residual phase error of the ghost-canceled carrier wave output from the DMUX 124. A trellis/FEC (forward error correction) decoder 136 trellis-decodes the output of the phase tracker 134, and error-correction decodes trellis-decoded data. A transport stream demultiplexer (TS DMUX) 138 restores various data streams from error-correction decoded data.

A source decoder 140 restores an original digital TV signal from the data stream after performing variable length decoding, inverse quantization, and inverse discrete cosine transform, and applies the result to the other input port of the display processor 142. The display processor 142 performs signal processing to receive the digitized analog TV signal or digital TV signal or both and display the result to a display 144.

Here, the analog IF converter through the sync separation and clock generator 104 through 108, the digital IF converter through the NRF 110 through 118, the DAC through the third ADC 126 through 132, and the phase tracker through the source decoder 134 through 140 can be called a first demodulator, a second demodulator, a first signal processor, and a second signal processor, respectively.

Figure 2:
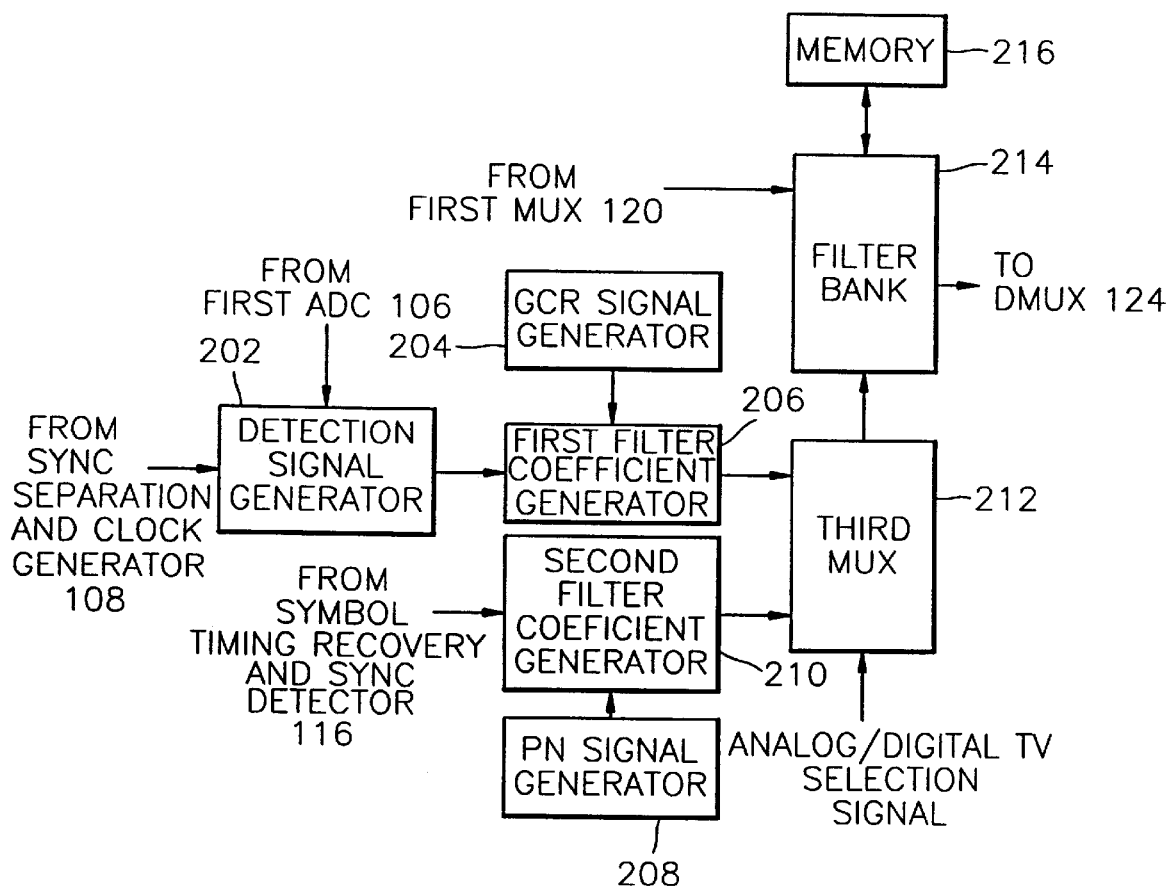
FIG. 2 is a block diagram illustrating a ghost canceler (the equalizer shown in FIG. 1) according to an embodiment of the present invention.

FIG. 2 is a block diagram of the equalizer 122 shown in FIG. 1, which includes a detection signal generator 202, a GCR signal generator 204, first and second filter coefficient generators 206 and 210, a PN signal generator 208, a third MUX 212, a filter bank 214 and a memory 216.

The operation of the equalizer 122 shown in FIG. 1 will now be described referring to FIG. 2. Referring to FIG. 2, the detection signal generator 202 generates a detection signal for detecting a ghost cancellation reference (GCR) signal carried in a vertical blanking period from image data supplied from the first ADC 106, using horizontal and vertical synchronous signals and a sampling clock signal generated by the sync separation and clock generator 108 shown in FIG. 1, and actually detects ghost cancellation reference data from the image data using the detection signal.

The first filter coefficient generator 206 generates filter coefficients for removing multipath distortion of an analog TV signal, using the ghost-canceled reference signal detected by the detection signal generator 202 and a GCR signal generated by the GCR signal generator 204, and applies the generated filter coefficients to an input port of the third MUX 212.

Here, the ghost, i.e., appearance of shadows on a TV screen, is generated by an electric wave from a broadcast station reflected by mountains, buildings, etc. When an analog TV signal is received, a broadcast station transmits a predetermined reference signal (here, a GCR signal) carried in the vertical blanking period, in order to cancel the ghost, so that a receiver can know the characteristics of a transmission channel.

The second filter coefficient generator 210 generates filter coefficients for removing multipath distortion of a digital TV signal, using a pseudo number (PN) signal included in the field synchronous signal supplied from the symbol timing recovery and sync detector 116 and a PN signal generated by the PN generator 208, and applies the generated filter coefficients to the other input port of the third MUX 212. Here, the digital TV signal is a VSB signal, and the PN signal can be called a known sequence or a training sequence.

The third MUX 212 is controlled by the analog/digital TV selection signal to select either the filter coefficients generated by the first filter coefficient generator 206 or those generated by the second filter coefficient generator 210. That is, when an analog TV signal is received, the filter coefficients generated by the first filter coefficient generator 206 are selected, and, when a digital TV signal is received, the filter coefficients generated by the second filter coefficient generator 210 are selected.

The filter coefficients selected by the third MUX 212 are applied to one input port of the filter bank 214 for multipath distortion removal. A signal selected by the first MUX 120 shown in FIG. 1, i.e., the digitized analog TV signal supplied from the first ADC 106 or the NRF-processed digital TV signal supplied from the NRF 118, is applied to the other input port of the filter bank 214.

The filter bank 214 removes multipath distortion of the signal selected by the first MUX 120, using the filter coefficients selected by the third MUX 212 and data stored in the memory 216, and outputs the result to the DMUX 124 shown in FIG. 1. The filter bank 214 is a filter having as many filter taps as corresponding to a predetermined period to cancel ghosts occurring in the predetermined period. That is, the filter bank 214 has hundreds of taps. Also, the memory 216 stores filter coefficients used by the filter bank 214, reads the stored filter coefficients, and applies the result to the filter bank 214, to improve the updating speed of the filter coefficients.

In the digital/analog TV common-use receiver according to the present invention which can receive both a terrestrial digital TV broadcast and an existing terrestrial analog TV broadcast, multipath distortion generated not only upon terrestrial digital TV broadcast but also upon a terrestrial analog TV broadcast can be removed by using a single ghost canceler (a waveform equalizer).

In the present invention, since an equalizer used upon receiving a terrestrial digital TV broadcast is commonly used when receiving a terrestrial analog TV broadcast, a single ghost canceler can cancel a ghost corresponding to both the digital and analog broadcast signals. Thus, the amount of receiver hardware and the price of the receiver can be sharply reduced, and reception quality of the terrestrial analog broadcast is improved.

What is claimed is:

1. A digital/analog TV common-use receiver having a single ghost canceler, which can receive both an analog TV signal and a digital TV signal, the single ghost canceler comprising:
   a first filter coefficient generator for generating first filter coefficients using a first reference signal included in the analog TV signal;
   a second filter coefficient generator for generating second filter coefficients using a second reference signal included in the digital TV signal; and
   a digital filter for filtering the analog TV signal using the first filter coefficients if the analog TV signal is received, and filtering the digital TV signal using the second filter coefficients if the digital TV signal is received, according to an analog/digital TV selection signal.

2. The digital/analog TV common-use receiver having a single ghost canceler as claimed in claim 1, wherein the first reference signal is a ghost cancellation reference signal.

3. The digital/analog TV common-use receiver having a single ghost canceler as claimed in claim 1, wherein the second reference signal is a predetermined signal included in a field synchronous signal.

4. The digital/analog TV common-use receiver having a single ghost canceler as claimed in claim 1, further comprising:
   a reference signal generator for generating the first reference signal and the second reference signal; and
   a selector for selecting filter coefficients generated by either the first or second filter coefficient generator, according to the analog/digital TV selection signal, and applying the selected filter coefficients to the digital filter.

5. The digital/analog TV common-use receiver having a single ghost canceler as claimed in claim 1, further comprising:
   a memory for storing the filter coefficients used by the digital filter, reading the stored filter coefficients, and applying the read filter coefficients to the digital filter, to improve the updating speed of the filter coefficients.

6. A digital/analog TV common-use receiver having a single ghost canceler, comprising:
   a tuner for receiving both terrestrial analog and digital TV signals;
   first and second demodulators for demodulating the terrestrial analog and digital TV signals into demodulated analog and digital TV signals, respectively;
   a single ghost canceler for canceling a ghost from the output of the first or second demodulator selected according to the analog/digital TV selection signal;
   first and second signal processors for restoring original analog and digital TV signals from the output of the ghost canceler; and
   a single display for displaying the outputs of the first and/or second signal processors,
   wherein the single ghost canceler comprises:
   a first filter coefficient generator for generating first filter coefficients using a first reference signal included in a baseband signal of the analog TV signal and a predetermined first reference signal;
   a second filter coefficient generator for generating second filter coefficients using a second reference signal included in a baseband signal of the digital TV signal and a predetermined second reference signal; and
   a digital filter for filtering the baseband signal of the analog TV signal using the first filter coefficients if the analog TV signal is received, and the baseband signal of the digital TV baseband signal using the second filter coefficients if the digital TV signal is received, according to an analog/digital TV selection signal.

7. The digital/analog TV common-use receiver having a single ghost canceler as claimed in claim 6, wherein the first reference signal is a ghost cancellation reference signal.

8. The digital/analog TV common-use receiver having a single ghost canceler as claimed in claim 6, wherein the second reference signal is a predetermined signal included in a field synchronous signal.

9. The digital/analog TV common-use receiver having a single ghost canceler as claimed in claim 6, further comprising:
   a reference signal generator for generating the first reference signal and the second reference signal; and
   a selector for selecting filter coefficients generated by either the first or second filter coefficient generator, according to the analog/digital TV selection signal, and applying the selected filter coefficients to the digital filter.

10. The digital/analog TV common-use receiver having a single ghost canceler as claimed in claim 6, further comprising:
    a memory for storing filter coefficients used by the digital filter, reading the stored filter coefficients, and applying the read filter coefficients to the digital filter, to improve the updating speed of the filter coefficients.

11. The digital/analog TV common-use receiver having a single ghost canceler as claimed in claim 6, wherein the first demodulator comprises:
    an analog intermediate frequency (IF) converter for converting the terrestrial analog TV signal received by the tuner into the baseband signal of the analog TV signal;
    a sync separation and clock generator for separating a synchronous signal from the baseband signal of the analog TV signal supplied from the analog IF converter, generating a first sampling clock signal which is synchronized with the separated synchronous signal, and applying horizontal and vertical synchronous signals; and
    a first analog-to-digital converter for converting the output of the analog IF converter into a digitized analog TV baseband signal according to the first sampling clock,
    wherein the second demodulator comprises:
    a digital IF converter for converting the terrestrial digital TV signal received by the tuner into a baseband signal of the digital TV signal;
    a second analog-to-digital converter for converting the output of the digital IF converter into a digitized digital TV baseband signal according to a second sampling clock;

a carrier wave recoverer for recovering a carrier wave from the digitized digital TV baseband signal and supplying a signal having the recovered carrier wave;

a symbol timing recovery and sync detector for detecting a symbol timing and a synchronous signal from the signal having the recovered carrier wave, and applying the second sampling clock signal synchronized with the symbol timing, and the synchronous signal; and an interference canceler for canceling an NTSC interference component existing in the signal which has a recovered carrier wave and is supplied from the carrier wave recoverer.

12. The digital/analog TV common-use receiver having a single ghost canceler as claimed in claim 11, further comprising:

a first selector for selecting either the digitized analog TV baseband signal or the signal having the recovered carrier wave output via the interference canceler, according to the analog/digital TV selection signal, and supplying the selected signal to the single ghost canceler; and a demultiplexer for outputting analog and digital TV signals from which multipath distortion has been removed and which are supplied via the single ghost canceler, according to the analog/digital TV selection signal.

13. The digital/analog TV common-use receiver having a single ghost canceler as claimed in claim 11, wherein the first signal processor comprises:

a digital-to-analog converter for converting the ghost-canceled digitized analog TV signal supplied from the single ghost canceler, into a ghost-canceled analog TV signal according to the first sampling clock signal;

a second selector for selecting either the baseband signal of the analog TV signal or the ghost-canceled analog TV signal supplied from the digital-to-analog converter, according to a ghost cancellation control signal;

an analog video signal processor for processing the selected analog TV signal selected by the second selector; and a third analog-to-digital converter for converting the output of the analog video signal processor into a digital signal according to the first sampling clock signal, wherein the second signal processor comprises:

a phase tracker for correcting a residual phase error of a ghost-canceled carrier wave supplied through the single ghost canceler;

a Trellis/FEC (forward error correction) decoder for Trellis-decoding the output of the phase tracker and correcting an error of the digital TV signal generated during transmission;

a transport stream demultiplexer for restoring various data streams from the output of the Trellis/FEC decoder; and a source decoder for restoring the original digital TV signal by performing variable-length decoding, inverse-quantization and inverse discrete cosine conversion on the data stream.

14. A ghost cancellation method for a digital/analog TV common-use receiver for receiving both an analog TV signal and a digital TV signal, comprising the steps of:

(a) generating first filter coefficients using a first reference signal included in the analog TV signal and a predetermined first reference signal;

(b) generating second filter coefficients using a second reference signal included in the digital TV signal and a predetermined second reference signal; and (c) filtering the analog TV signal using the first filter coefficients if the analog TV signal is received, and the digital TV signal using the second filter coefficients if the digital TV signal is received, according to an analog/digital TV selection signal.

15. The single ghost cancellation method as claimed in claim 14, wherein the first reference signal is a ghost cancellation reference signal.

16. The single ghost cancellation method as claimed in claim 14, wherein the second reference signal is a predetermined signal included in a field synchronous signal.

* * * * *